United States Patent
Siagam et al.

(10) Patent No.: US 10,307,943 B2
(45) Date of Patent: Jun. 4, 2019

(54) METHOD AND SYSTEM FOR VACUUM BAGGING

(71) Applicant: AIRBUS OPERATIONS GMBH, Hamburg (DE)

(72) Inventors: Paulin Fideu Siagam, Hamburg (DE); Hauke Seegel, Hamburg (DE); Claus Fastert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 197 days.

(21) Appl. No.: 15/204,575

(22) Filed: Jul. 7, 2016

(65) Prior Publication Data

US 2017/0008201 A1    Jan. 12, 2017

(30) Foreign Application Priority Data

Jul. 8, 2015 (EP) .................................. 15175926

(51) Int. Cl.
*B29C 43/56* (2006.01)
*B29C 70/34* (2006.01)
(Continued)

(52) U.S. Cl.
CPC ............ *B29C 43/56* (2013.01); *B29C 70/342* (2013.01); *B29C 70/44* (2013.01); *B29D 99/0014* (2013.01); *Y02T 50/43* (2013.01)

(58) Field of Classification Search
None
See application file for complete search history.

(56) References Cited

U.S. PATENT DOCUMENTS

| 5,123,985 A | 6/1992 | Evans et al. |
| 5,593,633 A | 1/1997 | Dull et al. |

(Continued)

FOREIGN PATENT DOCUMENTS

| CN | 102990944 A | 3/2013 |
| CN | 103889693 A | 6/2014 |

(Continued)

OTHER PUBLICATIONS

Extended European Search Report for Application No. 15175926 dated Mar. 7, 2016.
Partial European Search Report for Application No. 15175926 dated Jan. 8, 2016.
Smooth-On Inc: "How to make a reusable silicone vacuum bag for resin infusion", Internet Citation, Oct. 17, 2011 (Oct. 17, 2011), pp. 1-4, XP002723450, Retrieved from the Internet: URL:https://www.youtube.com/watch?v=XcJ-ErEVrsY#t=43 [retrieved on Apr. 22, 2014].

(Continued)

*Primary Examiner* — Monica A Huson
(74) *Attorney, Agent, or Firm* — Jenkins, Wilson, Taylor & Hunt, P.A.

(57) ABSTRACT

A vacuum bagging system for vacuum bagging a fiber-reinforced polymer component for an aircraft or spacecraft includes a vacuum bagging film or membrane which is configured to cover and seal the component during molding. The vacuum bagging film or membrane is pre-formed, e.g. thermoformed, to a shape or to an external geometry of the component to be molded. A method of vacuum bagging a fiber-reinforced polymer component of an aircraft or spacecraft, includes the steps of: arranging a component to be molded in a vacuum bagging assembly for forming a fiber-reinforced polymer component; pre-forming a vacuum bagging film or membrane to a shape or external geometry of the component; and arranging the vacuum bagging film or membrane on or over the component in the vacuum bagging assembly such that the film or membrane form-fittingly covers the component.

12 Claims, 2 Drawing Sheets

(51) Int. Cl.
*B29C 70/44* (2006.01)
*B29D 99/00* (2010.01)

(56) References Cited

U.S. PATENT DOCUMENTS

| | | | |
|---|---|---|---|
| 2002/0081415 A1* | 6/2002 | Toi | B29C 70/443 428/102 |
| 2007/0175171 A1 | 8/2007 | Delgado et al. | |
| 2008/0182054 A1 | 7/2008 | Ridges et al. | |
| 2010/0170326 A1 | 7/2010 | Miller et al. | |
| 2011/0175262 A1* | 7/2011 | Kiyomi | B29C 43/10 264/573 |
| 2012/0245286 A1 | 9/2012 | Younes | |
| 2012/0298296 A1 | 11/2012 | Thompson et al. | |
| 2014/0327190 A1 | 11/2014 | Ballow | |

FOREIGN PATENT DOCUMENTS

| | | |
|---|---|---|
| EP | 2873516 | 5/2015 |
| EP | 3115184 B1 | 9/2018 |

OTHER PUBLICATIONS

Alan Harper et al: "Reusable Silicone Bags, new analysis report provides Clean bill of health for use in advanced composites", Advanced Composites Manufacturing Event, Plymouth, Sep. 26, 2012, Sep. 26, 2012 (Sep. 26, 2012). pp. 1-39, XP002723449, DOI:http://compositesgateway.org/presentation/alan-advanced-composites-manuf-event.pdf.

Smooth-On: "Vacuum Bagging: A new direction", Internet, Oct. 30, 2011 (Oct. 30, 2011), pp. 1-3, XP055253695, Retrieved from the Internet: URL:https://web/archive/org/web/20111030115353/http://www.smooth-on.com/Vaccum-Bragging/c1334/index.html [retrieved on Feb. 29, 2016].

Chinese Office Action for Chinese Application No. 201610534756.3 dated Feb. 24, 2018.

Chinese Office Action for Chinese Application No. 201610534756.3 dated Feb. 24, 2018 (with Engl. Translation).

Chinese Office Action for Chinese Application No. 201610534756.3 dated Sep. 13, 2018.

\* cited by examiner

METHOD AND SYSTEM FOR VACUUM BAGGING

CROSS-REFERENCE TO RELATED APPLICATION

This application claims priority to EP 15 175 926.3 filed Jul. 8, 2015, the entire disclosure of which is incorporated by reference herein.

TECHNICAL FIELD

The disclosure herein relates to an improved system and method for vacuum bagging a component, especially a fiber-reinforced polymer component for an aircraft or spacecraft.

BACKGROUND

Vacuum bagging, or vacuum bag laminating as it is also known, is a technique widely used in the aircraft and aerospace industries to fabricate high strength-to-weight ratio fiber-reinforced composite components. Indeed, efforts are being made in aircraft construction to employ components on an increasing scale that are comprised either completely or at least partly of fiber-reinforced composite components, e.g. carbon-fiber-reinforced polymer/plastic (CFRP), as structural or load-bearing elements. Vacuum bagging involves arranging and sealing a vacuum bagging film or membrane over a component, which may be positioned on a molding tool. The component may, for example, be in the form of a wet laid-up laminate, or may comprise a core and/or reinforcing fibers into which a liquid polymer or resin is infused, for example in a process of resin transfer molding.

One area in which vacuum bagging techniques have been subject to difficulties in achieving reliable production results is in the area of very extensive or long component manufacture. In the aircraft and aerospace industries, for example, wing components which may include structural sections of more than 10 meters in length, and sometimes over 30 meters in length, have proven very challenging.

SUMMARY

It is therefore one of the ideas of the present disclosure to provide a new and improved technique for use in vacuum bagging which is particularly suited to enhancing reliability and quality of component production when the components have extensive dimensions, and especially for relatively long components.

According to one aspect, therefore, the disclosure herein provides a vacuum bagging system for vacuum bagging a fiber-reinforced polymer component, especially a component of an aircraft or spacecraft, the system comprising: a vacuum bagging film or membrane configured to cover and seal the component during molding, wherein the vacuum bagging film or membrane is pre-formed, especially thermoformed, to a shape or to an external geometry of the component.

In some embodiments, the component comprises at least one elongate structural member, such as a rib or a stringer, the shape or the external geometry of which is substantially uniform along a length thereof. For example, the at least one elongate structural member may have a substantially constant or uniform cross-section or profile; e.g. a T-section, an L-section, C-section, Z-section, Ω- or hat-section, or also an I-section. Accordingly, the vacuum bagging film or membrane is pre-formed to the shape or the external geometry of the at least one elongate structural member. In this regard, the component may include a plurality of elongate structural members and the vacuum bagging film or membrane may be pre-formed to the shape or external geometry of the plurality of elongate structural members. That is, the film or membrane may be configured to conform to the shape or geometry of several elongate members, which may, for example, extend parallel with one another on or as part of the component. This enables the vacuum bagging film or membrane to cover or extend continuously over a broad expanse of the component, which in turn reduces or minimizes the need to join or inter-connect different film or membrane segments and then ensure that each of those joins is properly sealed.

In some embodiments, the vacuum bagging film or membrane is provided as a continuous elongate strip or sheet and is pre-formed, e.g. thermoformed, to the shape or external geometry of the component over an entire length of the component. Accordingly, the film or membrane may have a longitudinal extent or length of up to 2 meters, optionally up to 5 meters or more, preferably more than 10 meters, and potentially even more than 20 meters. Thus, the vacuum bagging of wing components having structural sections of more than 30 meters in length becomes possible with a continuous pre-formed vacuum bagging film or membrane. In this way, it becomes possible to reduce or minimize the need to join or interconnect a number of film or membrane segments and then ensure that each of the joins is properly sealed.

In some embodiments, the vacuum bagging film or membrane is thermoformed to the shape or external geometry of the component, typically under the application of heat and pressure, e.g. differential pressure. The pre-formed film or membrane thereby typically has a predetermined shape corresponding to the component to be molded prior to the vacuum molding. In other words, the pre-formed film or membrane may be formed to be relatively stiff or fixed in the predetermined shape. This results in better surface quality in the vacuum molded component.

In some embodiments, the vacuum bagging film or membrane comprises a sheet or expanse of a polymer material, especially of a thermoplastic polymer. Thus, the film or membrane may, for example, be selected from the group consisting of polystyrene (such as high-impact polystyrene sheet), polyamide (e.g. nylon), PTFE, ETFE, and polyacrylate or acrylic polymers. The film or membrane can optionally be multi-layered and may comprise different material in the different layers to provide different and desired properties, such as vacuum tightness, sealing, and/or release properties. The vacuum bagging film or membrane may for example have a thickness in the range of 0.1 mm to 5 mm, particularly in the range of 0.5 mm to 3 mm, and more particularly in the range of about 1 mm to 2 mm.

According to another aspect, the disclosure herein provides a method of vacuum bagging a component, especially a fiber-reinforced polymer component for an aircraft or spacecraft, comprising the steps of:

arranging a component to be molded in a vacuum bagging assembly for forming a fiber-reinforced polymer component;

pre-forming a vacuum bagging film or membrane to a shape or an external geometry of the component to be molded; and arranging the pre-formed vacuum bagging film or membrane on or over the component to be molded in the vacuum bagging assembly such that the film or membrane form-fittingly covers the component during molding.

In some embodiments, the step of pre-forming the vacuum bagging film or membrane to the shape or external geometry of the component comprises arranging, e.g. laying, the vacuum bagging film or membrane on or over a pre-forming tool having the shape or external geometry of the component to be formed. In other words, the pre-forming tool is configured to have the same or a corresponding shape or external geometry as the component to be molded, such that the molding tool forms a replica or reproduction of the desired geometry.

In some embodiments, the step of pre-forming the vacuum bagging film or membrane to the shape or external geometry of the component comprises thermoforming the film or membrane, e.g. on the pre-forming tool, by applying heat to the film or membrane for softening and forming or shaping same to that shape or external geometry of the component. In this regard, the pre-forming tool may be heated. Alternatively and/or in addition, the step of applying heat may be performed locally and/or in an autoclave or oven.

In some embodiments, the step of arranging or laying the vacuum bagging film or membrane on the pre-forming tool comprises extruding the film or membrane directly onto or over the pre-forming tool. This can be advantageous because the film or membrane exiting an extruder assembly and being applied directly onto or over the tool will typically already be at a thermoforming temperature such that the pre-forming of the film or membrane may then take place immediately. This step of extruding the film or membrane may involve moving the tool relative to the extruder assembly, and/or moving the extruder assembly relative to the tool, in order to ensure that the vacuum bagging film or membrane is distributed or applied over the pre-forming tool substantially uniformly or evenly.

In some embodiments, the extruder assembly may include a slot-like nozzle through which the polymer film or membrane is extruded. The nozzle may be configured to give the film or membrane a greater thickness in specific regions, such as those regions which may be subject to a higher degree of elongation or thinning during the pre-forming, e.g. on the pre-forming tool.

In some embodiments, the step of arranging or laying the vacuum bagging film or membrane on or over the pre-forming tool comprises drawing or extending a sheet of the film or membrane from a supply roll. That is, the film or membrane may be pre-supplied in bulk on a roll or spool for then pre-forming to the shape or geometry of the component.

In some embodiments, the step of pre-forming the vacuum bagging film or membrane to the shape or external geometry of the component includes applying positive pressure to an upper surface of the film or membrane. Specifically, this step of applying positive pressure may involve a pressure applicator device, such as one or more contact roller or pressure die, for physically contacting the film or membrane to press same, e.g. locally, against the external geometry of the component, for example, while the film or membrane is on the pre-forming tool. Alternatively, and/or in addition, the step of applying positive pressure may include directing an air stream, e.g. a heated air stream, onto the film or membrane (e.g. by a blower/heater arrangement) to press the film or membrane against the external geometry of the component; e.g. while the film or membrane is on the pre-forming tool. Such a blower device may be particularly useful for providing higher pressure onto the film or membrane at or within the smaller radii of the tool.

In some embodiments, the step of pre-forming the vacuum bagging film or membrane to the shape or external geometry of the component includes applying suction or negative pressure to at least partially evacuate a space between the film or membrane and the desired geometry—e.g. of the pre-forming tool. In this way, the negative pressure generated below the film or membrane can be used to draw the film or membrane against the shape or external geometry of the component (i.e. under the action of the external atmospheric pressure) during pre-forming. This technique is particularly convenient as a vacuum bagging assembly typically already has suction available.

In some embodiments, the component comprises at least one elongate structural member, such as a rib or a stringer, the shape or the external geometry of which is substantially uniform along a length thereof, e.g. a T-section, L-section, C-section, Z-section, $\Omega$- or hat-section, or an I-section, whereby the film or membrane is pre-formed to the shape or the external geometry of the at least one elongate structural member in the component. In some embodiments, the component comprises a plurality of elongate structural members and the vacuum bagging film or membrane is pre-formed to the shape or the external geometry of the plurality of elongate structural members in the component. That is, the film or membrane may be sized to cover a number of elongate structural members in the component and over a length of those structural members.

In some embodiments, the method comprises the step of fixing a periphery or an edge region of the film or membrane prior to and/or during the step of pre-forming the film or membrane to the shape or external geometry of the component.

In some embodiments, the method of vacuum bagging the component comprises one or more of an open molding process and/or a resin infusion molding process. For example, the component may be formed from fiber-reinforced prepregs or a wet lay-up of reinforcing fibers which are covered and sealed with the pre-formed vacuum bagging film or membrane and cured under pressure. In an alternative embodiment, the component may be formed by infusing a dry lay-up of reinforcing fibers with a liquid resin within the pre-formed vacuum bagging film or membrane and then curing same under elevated temperature and pressure.

According to a further aspect, the present disclosure provides a method of pre-forming a vacuum bagging film or membrane to a shape or an external geometry of a component to be molded, especially a fiber-reinforced polymer component for aircraft or spacecraft, wherein the step of pre-forming the vacuum bagging film or membrane to the shape or external geometry of the component comprises arranging, e.g. laying, the vacuum bagging film or membrane on or over a pre-forming tool having the shape or external geometry of the component to be formed.

As already noted above, the pre-forming tool is configured to have the same or a corresponding shape or external geometry as the component to be molded in a subsequent vacuum bagging process, such that the molding tool forms a replica or reproduction of the desired geometry.

In some embodiments, the step of pre-forming the vacuum bagging film or membrane to the shape or external geometry of the component comprises thermoforming the film or membrane on the pre-forming tool by applying heat to the film or membrane for softening and forming or shaping same. Further possible features of the method of pre-forming the vacuum bagging film or membrane are described above.

According to another aspect, the present disclosure provides a pre-formed vacuum bagging film or membrane for vacuum bagging a component, especially a fiber-reinforced polymer component for an aircraft or spacecraft, produced by the method of the disclosure herein described above. The disclosure herein may also provide a component, and particularly a composite component, such as a fiber-reinforced plastic component, formed according to the vacuum bagging method of the disclosure herein described above.

The present disclosure thus provides a system and method which are able to significantly enhance reliability, robustness, ease and/or convenience in the manufacture of composite components, while also enabling a substantial improvement in the manufacturing speed.

BRIEF DESCRIPTION OF THE DRAWINGS

For a more complete understanding of the disclosure herein and the advantages thereof, exemplary embodiments of the disclosure herein are explained in more detail in the following description with reference to the accompanying drawing figures, in which like reference characters designate like parts and in which.

DETAILED DESCRIPTION

The accompanying drawings are included to provide a further understanding of the present disclosure and are incorporated in and constitute a part of this specification. The drawings illustrate particular embodiments of the disclosure herein and together with the description serve to explain the principles of the disclosure herein. Other embodiments of the disclosure herein and many of the attendant advantages of the disclosure herein will be readily appreciated as they become better understood with reference to the following detailed description.

It will be appreciated that common and well understood elements that may be useful or necessary in a commercially feasible embodiment are not necessarily depicted in order to facilitate a less abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of enquiry and study, except where specific meanings have otherwise been set forth herein.

Figure 1:
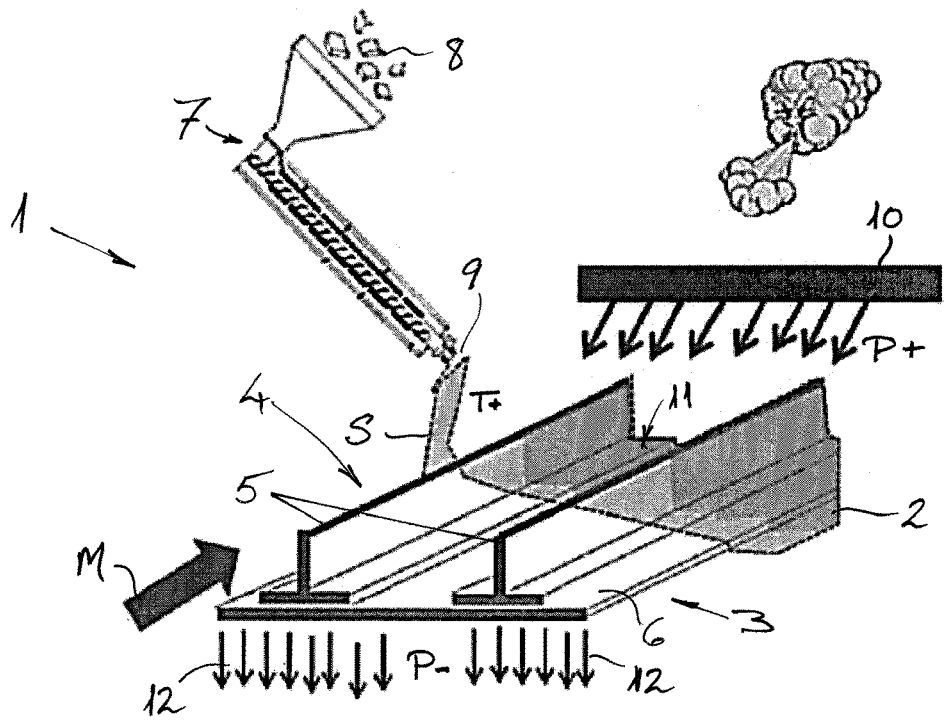
FIG. 1 is a schematic perspective view of a system for pre-forming a film or membrane for a vacuum bagging assembly and method according to one embodiment.

With reference to FIG. 1 of the drawings, a schematic view of system or assembly 1 for pre-forming a vacuum bagging film or membrane 2 for use in a vacuum bagging assembly (not shown) according to an embodiment of the disclosure herein is illustrated. The vacuum bagging assembly will typically include a molding tool that forms a base of the assembly. The molding tool is configured to support the component to be molded thereon and may comprise a mold or profile for imparting or maintaining a desired form at a side of the component supported thereon. The composite component to be molded is covered and sealed by the pre-formed film or membrane 2, and a space between the component and the film or membrane is typically evacuated under a partial vacuum. The partial vacuum is applied during the curing of pre-pregs or wet laid-up fiber-reinforcement of the component covered by the pre-formed film or membrane 2, or during infusion or impregnation of dry fiber-reinforcement of the component with a polymer resin and then its subsequent curing.

With this embodiment, a significantly improved vacuum bagging assembly is provided via a development of the vacuum bagging film or membrane 2. Referring to FIG. 1, a pre-forming tool 3 for pre-forming the vacuum bagging film or membrane 2 to a shape or an external geometry 4 of the composite component to be molded is illustrated schematically. In this regard, the pre-forming tool 3 is configured as a replica or reproduction of the shape or the external geometry 4 of the component to be molded. In particular, the shape or external geometry 4 of the tool 3 includes the shapes or external geometries 5 of a plurality of structural members (e.g. stringers) having a T-section or profile. These stringer shapes or profiles 5 are arranged extending parallel to one another over the shape or external geometry 6 of a panel profile (e.g. skin panel). The panel profile 6 of the pre-forming tool 3 in this example is substantially flat, although it could also be curved in other alternative embodiments.

FIG. 1 of the drawings shows an extruder assembly 7 which is configured to process raw plastic material 8 and to extrude a sheet S of the film or membrane 2 through a broad slot-like nozzle 9 directly onto the pre-forming tool 3 to cover the shape or external geometry 4. In this regard, the tool 3 may be moved in a direction M relative to the extruder assembly 7 to ensure an even distribution of the sheet S of the film or membrane 2 over the tool. Because the sheet S is extruded at an elevated temperature T+ and is soft as it emerges from the slot nozzle 9 of the extruder assembly 7, it is typically at a temperature suitable for thermoforming as it is applied to the tool 3. To this end, the pre-forming tool 3 is typically also heated to a desired, predetermined temperature T+ to promote the thermoforming. A pressure applicator device in the form of a blower device 10 is configured to apply positive pressure P+ to an upper side or surface 11 of the film or membrane 2 to press that film or membrane 2 against the shape or geometry 4 of the tool 3. In addition, suction 12 is provided which cooperates with the tool 13 for generating an under-pressure between the tool 3 and the film or membrane 2. In this regard, the tool 3 may include holes or apertures for communicating under-pressure generated by the suction 12 to the film or membrane 2.

Figure 2:
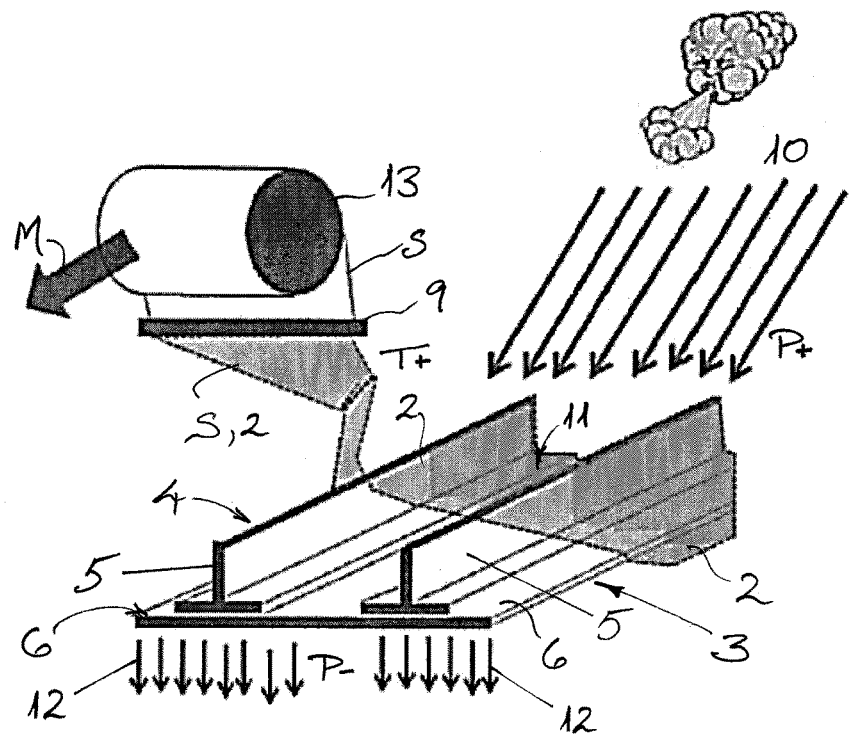
FIG. 2 is a schematic perspective view of a system for pre-forming a film or membrane for a vacuum bagging system and method according to another embodiment.

Referring now to FIG. 2 of the drawings, another embodiment of the system or assembly 1 for pre-forming a vacuum bagging film or membrane 2 is shown. In this embodiment, the sheet S of the film or membrane 2 is provided on a supply roll 13 and the sheet S is drawn or extended from the supply roll 13 over the pre-forming tool 3. The sheet S of the film or membrane 2 may again be drawn through a slot-like channel 9 within which it may undergo heating T+ before being laid onto and/or over the geometry 4 of the tool 3. As before, the pre-forming tool 3 is typically heated to a specific desired temperature T+ and the sheet S of the film or membrane 2 is exposed to both positive pressure P+ from blower device 10 and under-pressure or negative pressure P− from suction 12. Accordingly, in each of the embodiments of FIGS. 1 and 2, the film or membrane 2 is thermoformed to the shape or geometry 4 of the tool 3 and which it maintains, i.e. in a relatively stiff or fixed form, upon cooling.

By thermoforming the film 2 in this way, a pre-formed vacuum bagging film 2 is produced having a predetermined shape or geometry for the vacuum bagging assembly. When a composite component to be molded is arranged or laid-up in the vacuum bagging assembly of the preferred embodiment and prepared for curing of the pre-impregnated (prepreg) fiber-reinforcement, or, in the case of a dry lay-up, is prepared for impregnation with a liquid polymer resin and then curing, the composite component has the shape or the external geometry 4 of the pre-forming tool 3. Thus, when the vacuum bagging film or membrane 2 pre-formed according to the method and system 1 described above is placed on or over the laid-up component, it is configured to form-fittingly cover the component in the vacuum bagging assembly during the vacuum bagging. As the pre-forming tool 3 corresponds in size and shape to the laid-up composite component to be molded, the system 1 shown in the drawings may be imagined also to correspond essentially in its layout or configuration to a vacuum bagging system or assembly according to the disclosure herein.

Figure 3:
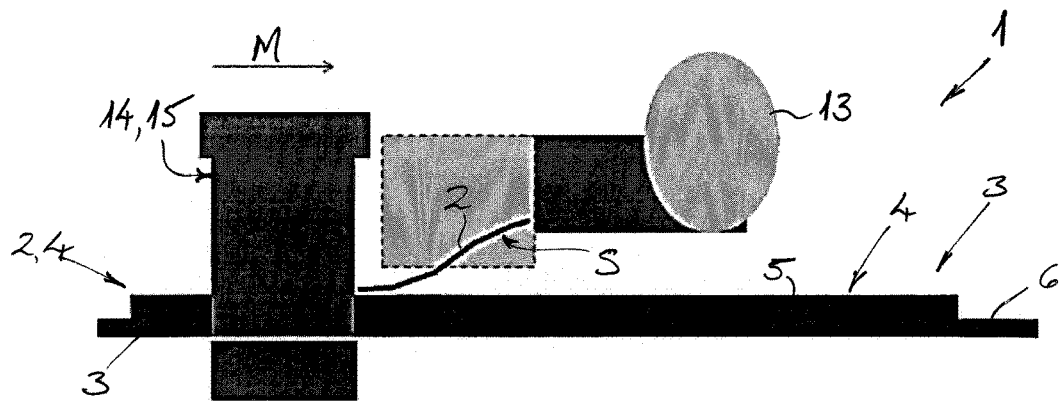
FIG. 3 is a schematic side view of a system to pre-form a film or membrane for a vacuum bagging system and method according to a further embodiment.
Figure 4:
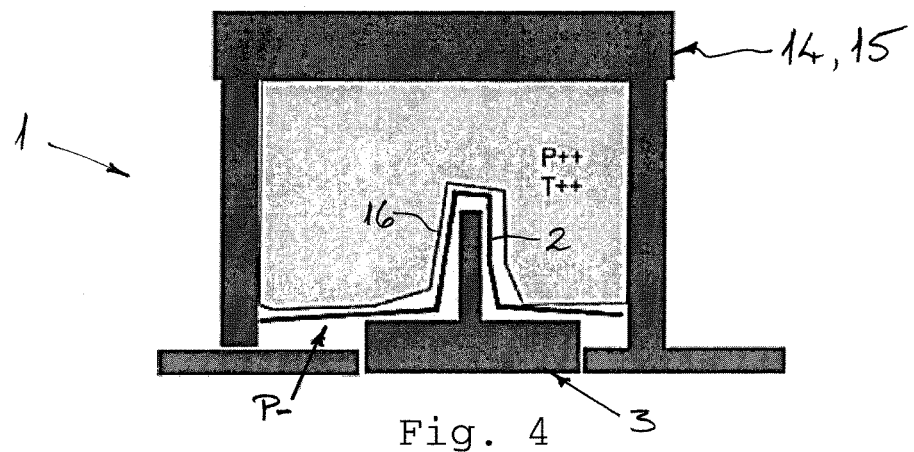
FIG. 4 is a schematic end view of a system for pre-forming a film or membrane for a vacuum bagging system and method according to yet another embodiment.

Referring to FIG. 3 of the drawings, a schematic side view of a system 1 for pre-forming a vacuum bagging film or membrane 2 according to a further embodiment is shown. In this example the sheet S of the film or membrane 2 is drawn from a supply roll 13 and may be fed and laid over the tool 3 progressively or semi-continuously in conjunction with the movement of a movable pressure chamber 14 and/or movable heating chamber or oven 15 for the localised application of positive pressure P+ and/or heat T+ for pre-forming (e.g. thermoforming) the film or membrane 2 to the desired shape or geometry 4. FIG. 4 of the drawings illustrates an end view of a pressure chamber 14 and/or a heating chamber or oven 15 as shown and described with reference to FIG. 3. As shown in FIG. 4, a pressure die 16 may be provided for applying positive pressure via contact with the upper side 11 of the film 2 and suction may be provide to generate a negative pressure P− below the film 2.

The system 1 and method for pre-forming a vacuum bagging film or membrane 2 as described above may be operated or performed on a continuous basis, e.g. with an essentially continuous sheet S of the film or membrane 2 from an extruder assembly 7 or supply roll 13, or on a discontinuous basis, e.g. with discrete or separate sheets S.

Figure 5:
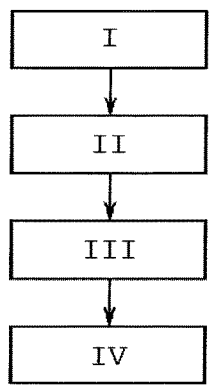
FIG. 5 is a flow diagram which schematically represents a method of vacuum bagging according to an embodiment of the disclosure herein.

With reference now to FIG. 5 of the drawings, a method of vacuum bagging a fiber-reinforced polymer component, e.g. of an aircraft or spacecraft according to an embodiment is shown schematically, with the numbered boxes I to IV of the diagram representing steps of the method. The first box I represents the step of arranging a component in a vacuum bagging system or assembly, in particular for forming a fiber-reinforced plastic component by resin transfer molding or impregnating same with a polymer or resin. The second box II represents the step of pre-forming a vacuum bagging film or membrane 2 to a shape or an external geometry 4 of the component to be molded. As noted above, this may involve thermoforming the film or membrane 2 on a pre-forming tool 3 which has the shape or external geometry 4 of the component to be molded. For example, this may include extruding a sheet or strip S of the film or membrane 2 or simply drawing such a sheet S of the film or membrane 2 from a supply roll 13 over the tool 3. Further, this step may include heating the film or membrane 2 to a thermoforming temperature and then applying pressure to press the film or membrane 2 into contact with the tool 3. The third box III of FIG. 5 represents the step of arranging the pre-formed vacuum bagging film or membrane 2 on or over the component in the vacuum bagging assembly so that the film or membrane 2 form-fittingly covers the composite component to be molded. The fourth box IV then represents the step of either curing the laid-up component comprising prepreg fiber polymer composite, or impregnating the dry fiber-reinforced component with polymer resin in a resin infusion process, and then curing to complete fabrication of the fiber-reinforced polymer component.

Although specific embodiments of the disclosure herein have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

What is claimed is:

1. A method of vacuum bagging a fiber-reinforced polymer component of an aircraft or spacecraft, comprising:
   arranging a component to be molded in a vacuum bagging assembly for molding the component;
   pre-forming a vacuum bagging film or membrane to a shape or an external geometry of the component to be molded; and
   arranging or laying the vacuum bagging film or membrane on or over the component to be molded in the vacuum bagging assembly such that the film or membrane form-fittingly covers the component during molding;
   wherein arranging or laying the vacuum bagging film or membrane on or over a tool for the pre-forming comprises:

extruding a sheet of the film or membrane onto the tool, whereby an extruder assembly is movable relative to the tool and/or the tool is movable relative to the extruder assembly, or drawing or extending a sheet of the film or membrane from a supply roll.

2. The method of claim 1, wherein pre-forming the vacuum bagging film or membrane to the shape or external geometry of the component comprises arranging the vacuum bagging film or membrane on or over a pre-forming tool having the shape or external geometry of the component to be molded.

3. The method of claim 1, wherein pre-forming the vacuum bagging film or membrane to the shape or external geometry of the component comprises thermoforming the film or membrane by applying heat to the film or membrane for softening and forming or shaping same to the external geometry of the component.

4. The method of claim 1, wherein pre-forming the vacuum bagging film or membrane to the shape or external geometry of the component comprises applying positive pressure to an upper surface of the film or membrane.

5. The method of claim 1, wherein pre-forming the vacuum bagging film or membrane to the shape or external geometry of the component includes applying a vacuum to at least partially evacuate a space between a tool for the pre-forming and the film or membrane.

6. The method of claim 1, wherein the component comprises at least one elongate structural member, the shape or the external geometry of which is substantially uniform along a length thereof, wherein the film or membrane is pre-formed to the shape or the external geometry of the at least one elongate structural member.

7. The method of claim 6, wherein the component comprises a plurality of elongate structural members and wherein the vacuum bagging film or membrane is pre-formed to the shape or the external geometry of the plurality of elongate structural members.

8. The method of claim 1, comprising fixing a periphery or an edge region of the film or membrane prior to and/or during pre-forming the film or membrane to the shape or the external geometry of the component.

9. The method of claim 2, wherein pre-forming the vacuum bagging film or membrane to the shape or external geometry of the component comprises laying the vacuum bagging film or membrane on or over a pre-forming tool having the shape or external geometry of the component to be molded.

10. The method of claim 4, wherein applying positive pressure to the upper surface of the film or membrane is performed via a blower device for directing a heated air stream onto the film or membrane.

11. The method of claim 4, wherein applying positive pressure to an upper surface of the film or membrane is performed via a pressure applicator device for contacting the film or membrane to press same locally against the external geometry of the component.

12. A method of vacuum bagging a fiber-reinforced polymer component of an aircraft or spacecraft, comprising:

arranging a component to be molded in a vacuum bagging assembly for molding the component;

pre-forming a vacuum bagging film or membrane to a shape or an external geometry of the component to be molded; and arranging or laying the vacuum bagging film or membrane on or over the component to be molded in the vacuum bagging assembly such that the film or membrane form-fittingly covers the component during molding;

wherein pre-forming the vacuum bagging film or membrane to the shape or external geometry of the component comprises applying positive pressure to an upper surface of the film or membrane via a blower device for directing a heated air stream onto the film or membrane or via a pressure applicator device for contacting the film or membrane to press same locally against the external geometry of the component.

* * * * *